United States Patent [19]
Hirayama et al.

[11] Patent Number: 5,495,612
[45] Date of Patent: Feb. 27, 1996

[54] SYSTEM FOR DYNAMICALLY CHANGING AN EXECUTION PROGRAM AND METHOD FOR DOING THE SAME

[75] Inventors: Hideaki Hirayama, Kawasaki; Shigefumi Ohmori, Tokyo; Tohru Iijima, Higashimatsuyama; Nobuyoshi Kamei, Yokohaha, all of Japan

[73] Assignee: Kabushiki Kaisha Toshiba, Kawasaki, Japan

[21] Appl. No.: 128,645

[22] Filed: Sep. 30, 1993

[30] Foreign Application Priority Data

Sep. 30, 1992 [JP] Japan .................. 4-261796

[51] Int. Cl.$^6$ .................. G06F 9/45
[52] U.S. Cl. .................. 395/700; 364/280.4; 364/262.5; 364/DIG. 1
[58] Field of Search .................. 395/650, 700

[56] References Cited

U.S. PATENT DOCUMENTS 5,408,665  4/1995  Fitzgerald .................. 395/700

Primary Examiner—Alvin E. Oberley
Assistant Examiner—John Q. Chavis
Attorney, Agent, or Firm—Cushman, Darby & Cushman

[57] ABSTRACT

By executing an additional link process, unresolved external reference information of object modules of new-version subroutines is resolved based on external reference information which is resolved when load modules are created, and a reference table for storing entry points of old-version subroutines and new-version subroutines and an additional load module are created. When an additional load process is executed, the additional load module and reference table dynamically loaded into a memory and a machine instruction of the entry points of the old-version subroutines is rewritten as a trap instruction. If the load module including the old-version subroutines are being executed, the execution of the load modules is continued by calling a control continuation process. When the old-version subroutines are called after the new-version subroutines are loaded in the memory, the new-version subroutines are called by executing a control transfer process. After the processing of the new-version subroutines is completed, the control is returned to a point where the old-version subroutines are called.

32 Claims, 17 Drawing Sheets

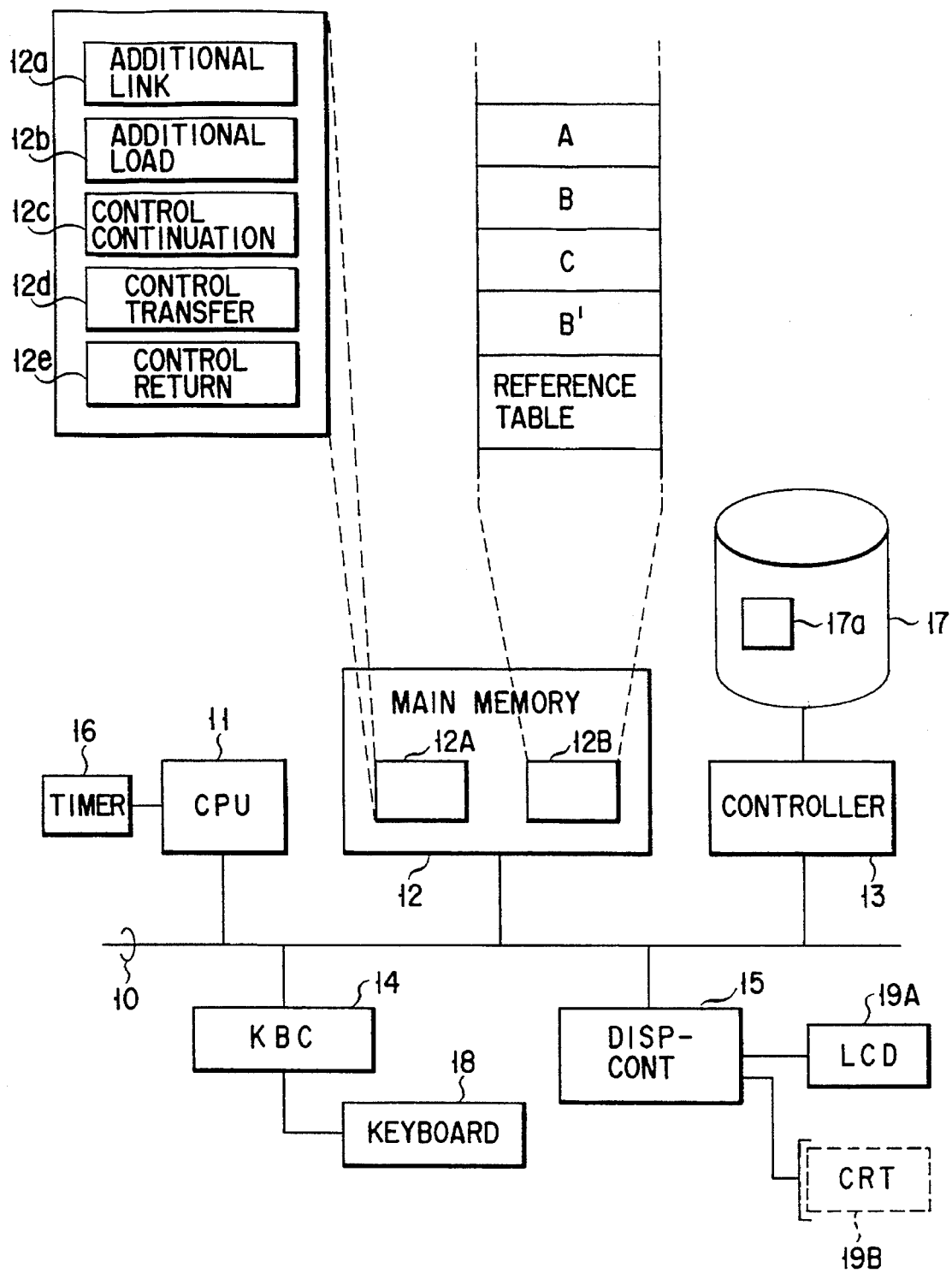
F I G. 1

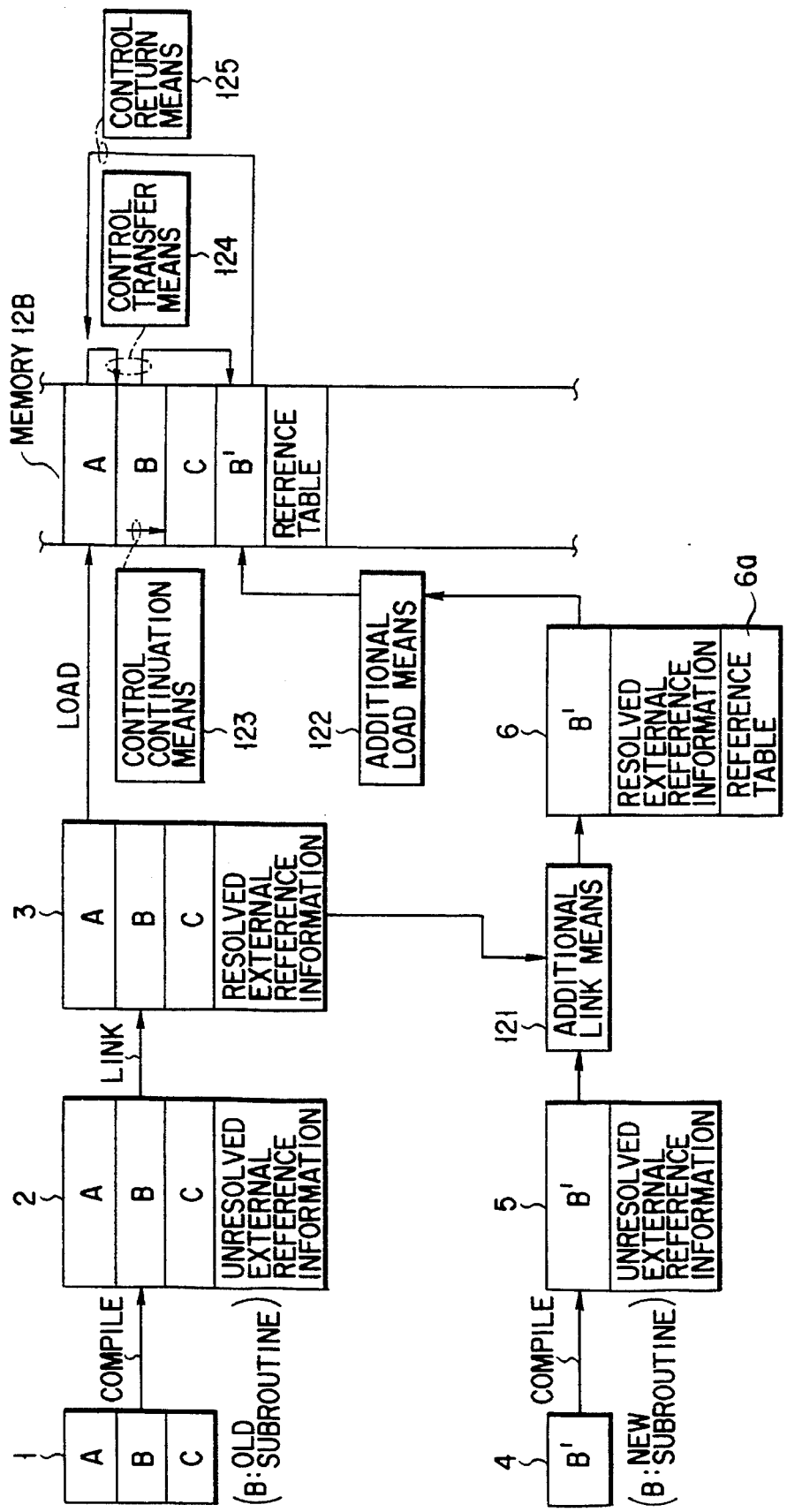
F I G. 2

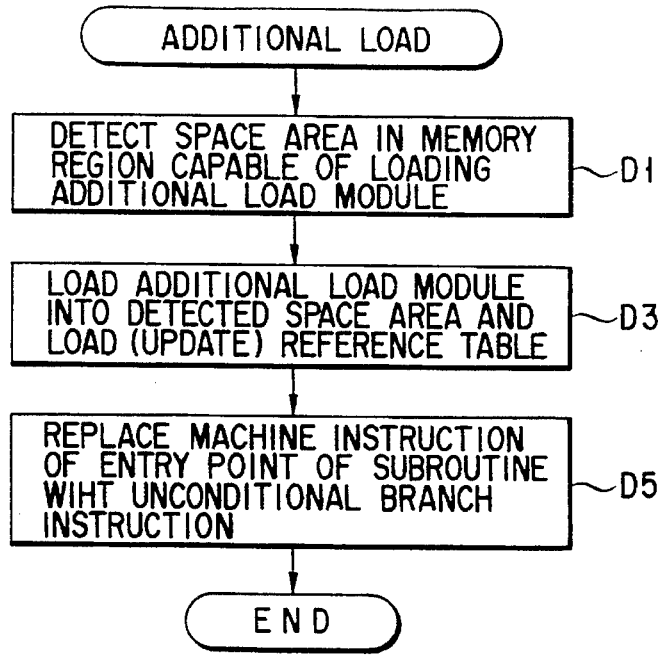
F I G. 6
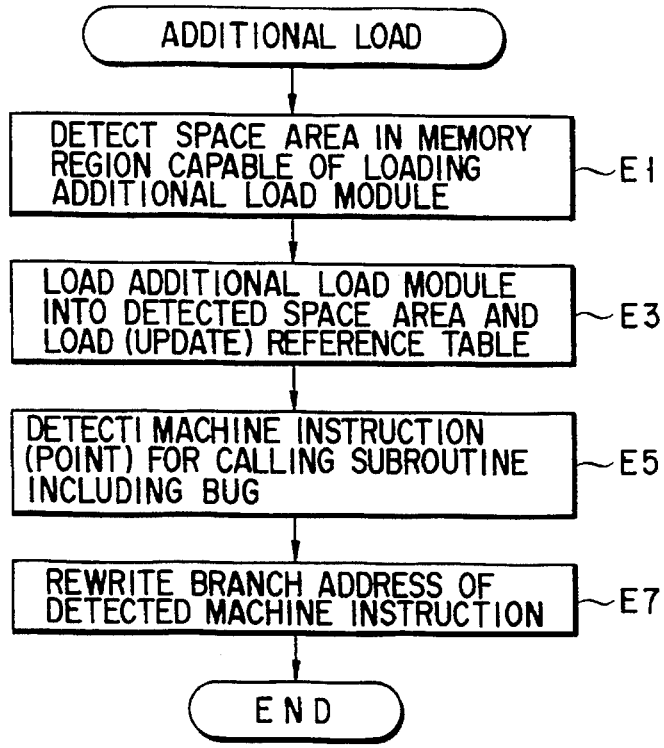
F I G. 7

TABLE sub [ x ]

| x | ENTRY POINT |
|---|---|
| 1 | sub 1 |
| 2 | sub 2 |
| ⋮ | ⋮ |

~T

| GENERA-TION sub | 0 | 1 | 2 | ... |
|---|---|---|---|---|
| s | add0s | add1s | add2s | ... |
| t | add0t | add1t | add2t | ... |
| ⋮ | ⋮ | ⋮ | ⋮ | |

T2

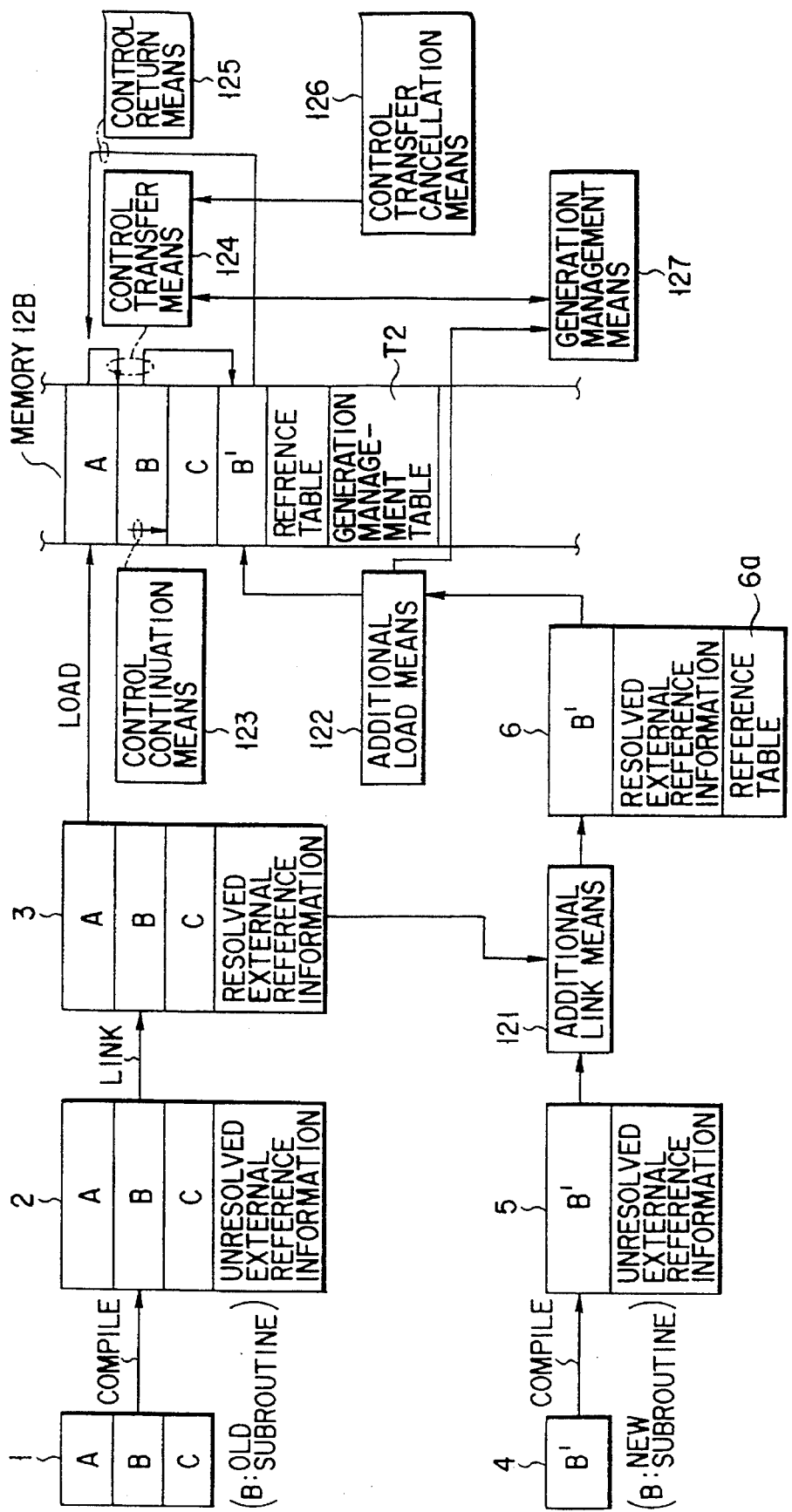
F I G. 14

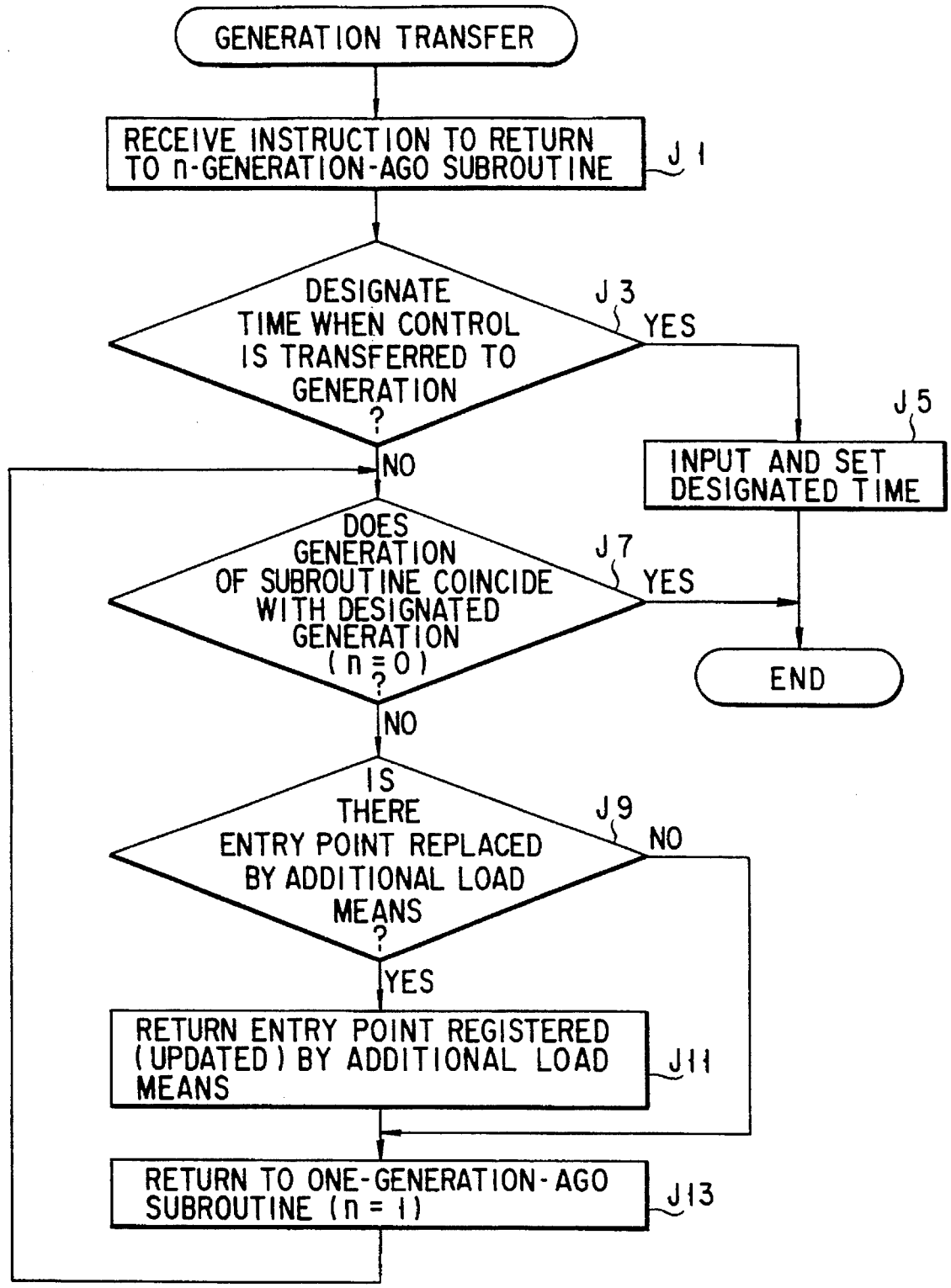
F I G. 20A

SYSTEM FOR DYNAMICALLY CHANGING AN EXECUTION PROGRAM AND METHOD FOR DOING THE SAME

BACKGROUND OF THE INVENTION

1. Field of the Invention

This invention relates to a system and a method for dynamically changing an execution program in order to improve reliability of a computer system and, more particularly, to a system and a method capable of changing a module, to which no debugging information has been applied yet, to an additional load module which has been debugged, without stopping the former module.

2. Description of the Related Art

The current large scale software, which is to be applied to an OS (operating system), a DBMS (database management system), a transaction processing system, and the like has a large number of programs covering several millions of lines so as to be adapted to a user, a system administrator, or an advanced processor device.

However, a method for debugging the programs covering several millions of lines has not yet been established in a technology for developing the large scale software. For this reason, even when the system is operated, programs including a number of bugs are continuously executed.

These bugs are usually found at proper time, and debugging information is prepared. A program is created based on the debugging information and applied to programs which are to be debugged. The debugged programs are compiled/linked to generate a load module. Conventionally, this load module is changed to another module to which no debugging information has been applied, after the latter module is stopped.

In the processing system such as the OS, DBMS, and transaction processing system, which is executed for a long time, a load module is hardly ever stopped. Therefore, there are not many opportunities to change the load module to another one. Even when a new module is created based on debugging information, it is difficult to apply the new module.

Since a system tends to operate without stopping from now on, it is expected that the above-described problem becomes serious more and more. For example, if a fault-tolerant system is used, system down due to a trouble of hardware can be reduced, but system down due to a bug of software cannot be reduced. Furthermore, a bug of software becomes serious more and more as a processing system is highly advanced and operated without stopping.

SUMMARY OF THE INVENTION

It is accordingly an object of the present invention to provide a system and a method for dynamically changing execution programs without stopping the operation of an information processing system or stopping the execution of modules to be changed when debugging information is applied to the information processing system to debug a program.

According to a first aspect of the present invention, there is provided a computer system having a memory device for storing source programs and various modules which are created, a memory space into which the modules are loaded, and a CPU (central processing unit), for compiling the source programs into object modules, linking the object modules to generate load modules, resolving unresolved external reference information caused in the object modules, and loading the load modules into the memory space, the computer system comprising:

an additional link unit for resolving unresolved external reference information caused in an object module including a second subroutine based on the external reference information resolved when the load modules are generated, and creating an additional load module from the object module including the second subroutine, thereby updating a first subroutine loaded into the memory space;

an additional load unit for loading the additional load module created by the additional link unit into the memory space;

a transfer unit for calling the second subroutine of the additional load module in place of the first subroutine when the first subroutine is called from the load modules; and a return unit for returning control to points where the first subroutine is called when processing of the second subroutine is completed, and continuing the processing after the points.

According to a second aspect of the present invention, there is provided a computer system for compiling and linking source programs to generate load modules, and loading the load modules into a memory to be executed, comprising:

an additional link unit for updating some of subroutines in the source programs, compiling the subroutines into object modules of new-version subroutines, determining external reference information of the object modules based on address information of the load modules, and creating an additional load module;

an additional load unit for dynamically loading the additional load module in the memory space when load modules including old-version subroutines are loaded into the memory;

a transfer control unit for transferring control to the new-version subroutines when the load modules call the old-version subroutines; and a control return unit for returning the control to a calling point when processing of the new-version subroutines is completed.

The computer system according to the second aspect further comprises:

a control transfer cancellation unit for disabling the control transfer unit and returning the control to the old-version subroutines;

a generation management unit for managing generations of the new-version subroutines including the additional load module loaded into the memory and the old-version subroutines to which the control is returned by the load modules; and a time management unit for adapting the control transfer unit to the subroutines of an arbitrary version from designated time.

According to a third aspect of the present invention, there is provided a method for changing execution programs in a computer system having a memory device for storing source programs and various modules which are created, a memory space into which the modules are loaded, and a CPU (central processing unit), for compiling the source programs into object modules, linking the object modules to generate load modules, resolving unresolved external reference information caused in the object modules, and loading the load modules into the memory space, the method comprising the steps of:

a) resolving unresolved external reference information caused in an object module including a second subroutine based on the external reference information resolved when the load modules are generated, and creating an additional load module from the object module including the second subroutine, thereby updating a first subroutine loaded into the memory space;

b) loading the additional load module created in the step a) into the memory space;

c) calling the second subroutine of the additional load module in place of the first subroutine when the first subroutine is called from the load modules; and d) returning control to points where the first subroutine is called when processing of the second subroutine is completed, and continuing the processing after the points.

According to a fourth aspect of the present invention, there is provided a method of dynamically changing execution programs in a computer system for compiling and linking source programs to generate load modules, and loading the load modules into a memory to be executed, the method comprising the steps of:

a) updating some of subroutines in the source programs, compiling the subroutines into object modules of new-version subroutines, determining external reference information of the object modules based on address information of the load modules, and creating an additional load module;

b) dynamically loading the additional load module in the memory space when load modules including old-version subroutines are loaded into the memory;

c) transferring control to the new-version subroutines when the load modules call the old-version subroutines; and d) returning the control to a calling point when processing of the new-version subroutines is completed.

In the above constitution of the computer system according to the present invention, the link unit determines (resolves) external reference information of object modules of new-version subroutines, which are created on the basis of debugging information, using address information of load modules, and generates an additional load module. The additional load module is dynamically loaded into the memory space by the additional load unit even while modules including old-version subroutines are being executed. When the old-version subroutines are called by the load modules, the control is transferred to the new-version subroutines by the control transfer unit. When the processing of the new-version subroutines is completed, the control is returned to the calling subroutine by the control return unit. The processing of the old-version subroutines is continued as it is by the control continuation unit.

As described above, when a bug is found in programs, new-version subroutines are generated based on debugging information and compiled/linked into new load modules. In this case, new programs are executed, without stopping load modules which had been executed when the bug was found. If, therefore, the debugging information is applied to the processing system, a system and a method for changing load programs, without stopping the modules to be debugged.

Furthermore, if the debugging information is inadequate, the above system and method can be achieved even when the control is returned to the old-version load modules.

If the new-version subroutines are debugged inadequately for several generations, the transfer of the control to the new-version subroutines can be stopped, and the control can be returned to a designated subroutine which is before the current subroutine by several generations.

When the control is transferred to the new-version subroutines or the control is transferred to the old-version subroutines for several generations, it can be transferred to an arbitrary subroutine after the designated time.

The foregoing system and method for dynamically changing execution programs are capable of providing more flexible system environment and programming environment of computers.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing a constitution of a processing system acceding to a first embodiment of the present invention;

FIG. 2 is a block diagram showing a function of the processing system according to the first embodiment of the present invention;

FIG. 6 is a flowchart for explaining an additional load operation of a processing system according to a second embodiment the present invention;

FIG. 7 is a flowchart for explaining an additional load operation of a processing system according to a third embodiment of the present invention;

FIG. 14 is a block diagram showing a function of the processing system according to the sixth embodiment of the present invention;

FIGS. 20A and 20B are flowcharts for explaining a second example of the time designation operation of the processing system according to the seventh embodiment of the present invention.

DETAILED DESCRIPTION OF THE PREFERRED EMBODIMENTS

Figure 3:
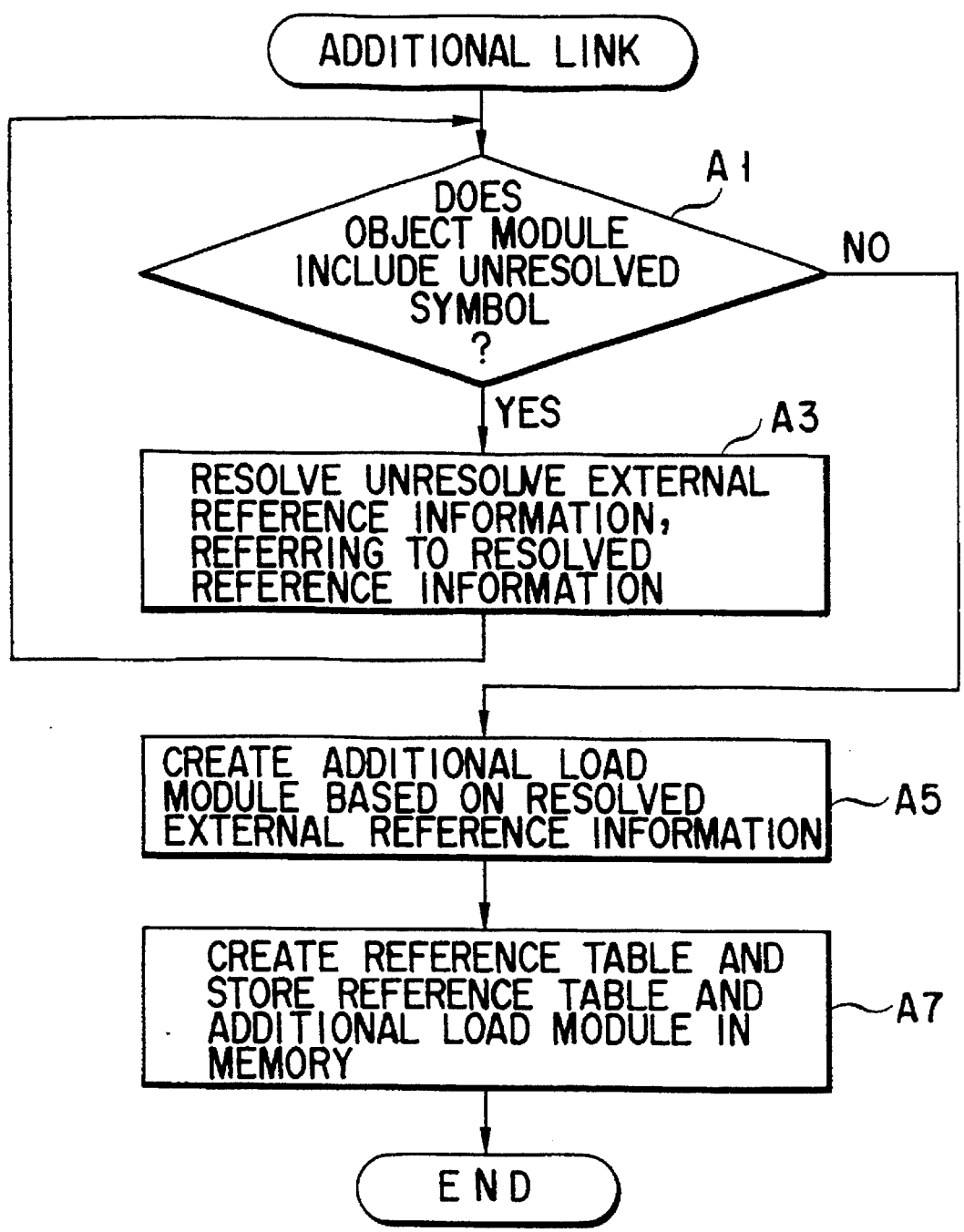
FIG. 3 is a flowchart for explaining an additional link operation of the processing system according to the first embodiment of the present invention.

Embodiments of the present invention will now be described, with reference to the accompanying drawings.

FIG. 1 shows a constitution of a processing system according to a first embodiment of the present invention. In this processing system, a CPU (central processing unit) 11, a main memory 12, a disk controller 13, a KBC (keyboard controller) 14, and a DISP-CONT (display controller) 15 are connected to one another by means of a bus 10 in order to transmit/receive data of various types.

The CPU 11 controls the entire processing system and is connected to a timer 16. The timer 16 informs the CPU 11 of the present time and a lapse of predetermined time when the need arises.

The main memory 12 includes memory regions (memory spaces) 12A and 12B for storing various programs including an OS (operation system) and various execution programs sent from the other memory such as a disk. For example, the memory region 12A stores an additional link process 12a, an additional load process 12b, a control continuation process 12c, a control transfer process 12d, and a control return process 12e. The memory region 12B stores load modules A, B, C and B', which are copied from a memory such as a disk, and a reference table.

The disk controller 13 is connected to a memory device 17 such as a magnetic disk and controls an access to the memory device 17 and reading/writing of data. The memory device 17 stores a variety of programs in the form of source programs, execution programs and the like.

The KBC 14, which is connected to a keyboard 18, converts an instruction of an operator such as a system manager input by the keyboard 18 into a predetermined code and transmits it to the bus 10.

The DISP-CONT 15 is connected to an LCD (liquid crystal display) 19A serving as a display device. The DISP-CONT 15 causes data to be displayed on the LCD 19A based on the data of various types transmitted through the bus 10. If necessary, a CRT (cathode-ray tube) display 19B can be connected to the DISP-CONT 15.

The foregoing processes stored in the main memory 12 will now be described.

When the additional link process 12a is called by the CPU 11, unresolved information of an object module generated on the basis of debugging information is resolved on the basis of external reference information resolved when a load module which is to be debugged is created, and an additional load module and a reference table (described later) are created.

When the additional load process 12b is called by the CPU 11, the above additional load module and reference table are loaded into the memory region into which the to-be-debugged load module is loaded, so as not to overlap another module. Further, a machine instruction of an entry point of the to-be-debugged load module is replaced with a trap instruction or a fraudulent instruction.

If the to-be-debugged module is being executed when the additional load module is loaded into the memory region, the control continuation process 12c is called, an operation for eliminating the entry point of the to-be-debugged module is continued. When the control transfer process 12d is called, the control is transferred to a new module in response to the trap instruction or fraudulent instruction. When the control return process 12e is called, the processing of the new module is completed and then the control is returned to calling subroutine which has called the new module.

FIG. 2 is a block diagram showing a function of the processing system according to the first embodiment of the present invention. As shown in FIG. 2, a source program 1 including three subroutines (A), (B) and (C) is compiled into an object module 2. The object module 2 is then linked to generate a load module 3, and the load module 3 is loaded into the memory region 12B and executed.

If a bug is found in the subroutine (B) of the source program 1, debugging information indicative of a method for eliminating the bug is prepared, and the subroutine (B) is debugged based on the debugging information, thereby forming a new-version subroutine (B').

When the subroutine (B') is formed, a source program 4 including the subroutine (B') is compiled into an object module 5.

An additional link means 121 creates an additional load module 6 such that external reference information (address) obtained from the subroutine (B') of the object module 5 becomes equal to external reference information obtained from the subroutine (B) of the object module 2. Simultaneously, the additional link means 121 creates a reference table 6a which will be described later.

The additional load module 6 (including the reference table 6a) is loaded, by an additional load means 122, into the memory region 12B into which the load module including the subroutines (programs) (A), (B) and (C) is loaded, so as not to overlap another subroutine.

Furthermore, a machine instruction of the entry point of the subroutine (B) loaded into the memory region 12B, is replaced with a trap instruction or a fraudulent instruction. Therefore, a trap occurs when the subroutine (B) is called after the load processing of the additional load means 122 is executed and, in this case, the control of the processing system is transferred to the subroutine (B') by a control transfer means 124 as if the subroutine (B') were called in place of the subroutine (B).

When the execution of the subroutine (B') is finished, a control return means 125 returns the control to a routine which has called the subroutine (B).

If the subroutine (B) is being executed when the additional load module 6 is loaded into the memory region 12B, the execution of the subroutine (B) has to be continued. That is, the entry point of the subroutine (B) loaded into the memory region 12B is eliminated, and the execution thereof is continued by a control continuation means 123.

As described above, if the subroutine (B) which is to be debugged is being executed when the additional load module 6 is loaded into the memory region 12B, the subroutine (B) continues to be executed until the control is returned from the subroutine (B) to the original subroutine which called the subroutine (B). After the control is returned to the original subroutine, the subroutine (B') is executed in place of the subroutine (B). Consequently, in a processing system which continues to operate for a long time, a program can be debugged without stopping the system.

An operation of the additional link means 121 will now be described, with reference to the flowchart shown in FIG. 3. As described above, the additional link means 121 resolves the unresolved external reference information of the object module of the subroutine created based on the debugging information, based on the external reference information resolved when a load module including a subroutine which is to be debugged is created.

First, it is determined whether unresolved reference information, i.e., an unresolved symbol is included in the object module 5 (step A1). If the unresolved reference information is detected (YES in step A1), the unresolved external reference information is resolved based on external reference information resolved in the link process for creating the load module 3 (step A3). If no unresolved reference information is detected or all the unresolved reference information is detected (NO in step A1), the additional load module 6 is generated on the basis of the resolved external reference information (step A5). After the additional link means 121 creates the additional load module 6, it creates a reference table 6a for storing an entry point (address) of a subroutine of the load module 3 which is to be debugged and an entry point (address) of the debugged subroutine, and stores them in a memory device, e.g., the disk memory device 17 shown in FIG. 7, together with the additional load module 6 created in step A5 (step A7).

An operation of the additional load means 122 will now be described, with reference to the flowchart shown in FIG. 4. The additional load means 122 loads the additional load module 6 created by the additional link means 121 into the memory region 12B into which the load module 3 is already loaded.

The additional load means 122 detects a space area which is formed in the memory region 12B into which the currently-executed load module 3 is loaded and is capable of loading the additional load module 6 (step B1). The additional load module 6 stored in the disk memory device 17 is loaded into the space area detected in the step B1 (step B3). The additional load means 122 also loads the reference table 6a created by the additional link means 121 into the space area formed in the memory region 12B. If the reference table 6a already exists in the space area and includes an entry point of a subroutine to be debugged, an entry point of the subroutine of the additional load module 6 is updated and registered in a position where the entry point of the debugged subroutine is registered.

The additional load means 122 replaces a machine instruction of the entry point of the subroutine whose function is changed by the additional load module 6 and which is already loaded into the memory region 12B, with a trap instruction (SVC instruction: supervisor call instruction) or a fraudulent instruction (step B5). With this operation, the additional load module 6 and reference table 6a are loaded into the memory region 12B, and the trap instruction or fraudulent instruction is issued when the to-be-debugged subroutine is called.

An operation of the control transfer means 124 will now be described, with reference to the flowchart shown in FIG. 5. The control transfer means 124 causes the additional load means 122 to load the additional load module 6 into the memory region into which the load module 3 is already loaded and then transfers the control to a subroutine to which debugging information is applied when a subroutine to which no debugging information has been applied is called.

Figure 5:
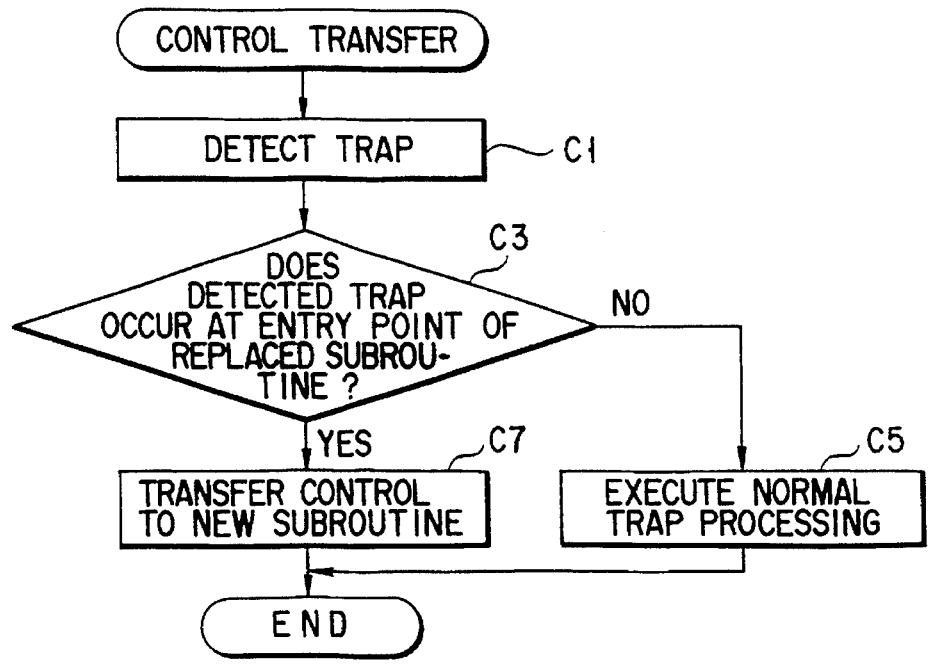
FIG. 5 is a flowchart for explaining a control transfer operation of the processing system according to the first embodiment of the present invention.

As shown in FIG. 5, the occurrence of a trap, i.e., the execution of a trap instruction is detected first (step C1). The control transfer means 124 determines whether the detected trap instruction was issued at the entry point (address) of the subroutine whose function is changed by the debugged subroutine, using the reference table 6a loaded into the memory region 12B (step C3). If NO, the normal trap processing is executed (step C5). If YES, the control is transferred to a new-version subroutine, i.e., the debugged subroutine of the reference table 6a, on the basis of the entry point of the debugged subroutine (step C7). According to the above operation, when a subroutine including a bug is called, the control is transferred from the subroutine to another subroutine which was debugged based on debugging information.

In the first embodiment, even though the processing system does not include the control return means 125, the additional link means 121 and additional load means 122 partially fulfills the function thereof. More specifically, when the control is transferred to the debugged subroutine and the execution of the debugged subroutine is completed, the control is returned to a routine which calls a subroutine whose function is changed by the debugged subroutine. This is because the additional link means 121 generates the additional load module 6 from the object module 5 on the basis of the external reference information which is resolved when the load module 3 is created.

Furthermore, in the first embodiment, even though the processing system does not include the control continuation means 123, the additional load means 122 and the control transfer means 124 partially fulfills the function thereof. When the additional load means 122 loads the additional load module 6 into the memory region 12B, if a subroutine whose function is to be changed by a subroutine which is debugged based on debugging information, is being executed, the execution of the subroutine is continued. This is because only the machine instruction of the entry point of the subroutine whose function is to be changed is operated by the additional load means 122, and the control is transferred to a new-version subroutine by the control transfer means in accordance with a trap generated at the entry point of the subroutine.

A processing system according to a second embodiment of the present invention will now be described. In the second embodiment, the additional load process 12b and the additional load means 122 of the first embodiment are modified. Since the constitution and function of the processing system of the second embodiment are the same as those of the processing system of the first embodiment, their descriptions are omitted. Hereinafter a modification to the additional load means 122 will be referred to as an additional load means 122a in the second embodiment.

FIG. 6 shows a flowchart for explaining an operation of the additional load means 122a of the second embodiment.

The additional load means 122a detects a space area which is formed in the memory region 12B into which the currently-executed module 3 is loaded and is capable of loading the additional load module 6 (step D1). The additional load module 6 stored in the disk memory device 17 is loaded into the space area detected in the step D1 (step D3). The additional load means 122a also loads the reference table 6a created by the additional link means 121 into the space area formed in the memory region 12B. If the reference table 6a already exists in the space area and includes an entry point of a subroutine to be debugged, an entry point of the subroutine of the additional load module 6 is updated and registered in a position where the entry point of the debugged subroutine is registered.

The additional load means 122a replaces a machine instruction of the entry point of the subroutine whose function is changed by the additional load module 6 and which is already loaded into the memory region 12B, with an unconditional branch instruction (e.g., GO TO statement) (step D5).

If the above additional load means 122a is used in the processing system, the control transfer means 124 need not execute any processing according to a trap instruction but executes simple processing. In other words, the control transfer means 124 is capable of transferring the control to the subroutine to which debugging information is applied, without performing any trap operation. However, whether the additional load means 122a can be executed depends upon the characteristics of the processing system, such as the characteristic in which a condition code is not changed by the unconditional branch instruction.

A processing system according to a third embodiment of the present invention will now be described. In the third embodiment, the additional load process 12b and the additional load means 122 of the first embodiment are modified. Since the constitution and function of the processing system of the third embodiment are the same as those of the processing system of the first embodiment, their descriptions are omitted. Hereinafter a modification to the additional load means 122 will be referred to as an additional load means 122b in the third embodiment.

FIG. 7 shows a flowchart for explaining an operation of the additional load means 122b of the third embodiment.

The additional load means 122b detects a space area which is formed in the memory region 12B into which the currently-executed module 3 is loaded and is capable of loading the additional load module 6 (step E1). The additional load module 6 stored in the disk memory device 17 is loaded into the space area detected in the step E1 (step E3). The additional load means 122b also loads the reference table 6a created by the additional link means 121 into the space area formed in the memory region 12B. If the reference table 6a already exists in the space area and includes an entry point of a subroutine to be debugged, an entry point of the subroutine of the additional load module 6 is updated and registered in a position where the entry point of the debugged subroutine is registered.

The additional load means 122b detects a machine instruction for calling a subroutine whose function is changed by the additional load module 6 and which is already loaded into the memory region 12B (step E5). The additional load means 122b rewrites a branch address of the machine instruction detected in step E5 as an entry point (address) of the subroutine of the additional load module 6 (step E7).

If the additional load means 122b is used in the processing system, the processing of the control transfer means 124 is made simpler than that in the first embodiment. In other words, a subroutine to which debugging information is applied is called in place of a subroutine including a bug. However, whether the additional load means 122b can be executed depends upon the system or program. For example that depends upon that an instruction for calling the subroutine is not include an entry point of a subroutine as a variable.

Figures 8, 9:
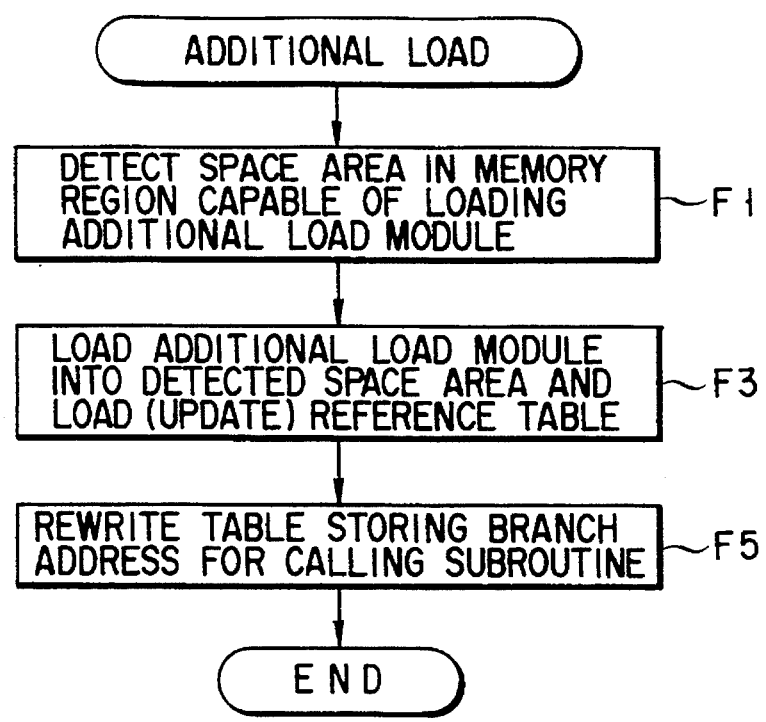
FIG. 8 is an example of a table representing an entry point of a subroutine of a processing system according to a fourth embodiment of the present invention.
FIG. 9 is a flowchart for explaining an additional load operation of the processing system according to the fourth embodiment of the present invention.

A processing system according to a fourth embodiment of the present invention will now be described. In the fourth embodiment, the additional load process 12b and the additional load means 122 of the first embodiment are modified. Since the constitution and function of the processing system of the fourth embodiment are the same as those of the processing system of the first embodiment, their descriptions are omitted. However, the memory region 12B shown in FIGS. 1 and 2 stores a table T for storing an entry point of a function and a branch address for calling the function. An example of the table T is shown in FIG. 8. The table T shown in FIG. 8 stores a branch address for calling a function sub [x]. For example, when a function sub [1] is called, a branch address sub1 is read out with reference to the table T.

Hereinafter a modification to the additional load means 122 will be referred to as an additional load means 122c in the fourth embodiment.

FIG. 9 shows a flowchart for explaining an operation of the additional load means 122c of the fourth embodiment.

The additional load means 122c detects a space area which is formed in the memory region 12B into which the currently-executed module 3 is loaded and is capable of loading the additional load module 6 (step F1). The additional load module 6 stored in the disk memory device 17 is loaded into the space area detected in the step E1 (step F3). The additional load means 122c also loads the reference table 6a created by the additional link means 121 into the space area formed in the memory region 12B. If the reference table 6a already exists in the space area and includes an entry point of a subroutine to be debugged, an entry point of the subroutine of the additional load module 6 is updated and registered in a position where the entry point of the debugged subroutine is registered.

The additional load means 122c rewrites the table T which stores a branch address (entry point) for calling a subroutine whose function is changed by the additional load module 6 (step F5). In other words, the additional load means 122c rewrites a branch address of a subroutine which is registered in the table T and whose function is changed by the additional load module 6, as an entry point of the subroutine of the additional load module 6 which is loaded into the memory region 12B by the additional load means 122.

If the additional load means 122c is used in the processing system, the processing of the control transfer means 124 is made simpler than that in the first embodiment. In other words, a subroutine to which debugging information is applied is called in place of a subroutine including a bug. However, whether the additional load means 122c can be executed depends upon a program organizing method, since the system has to be so constructed that entry points of all the subroutines are stored in the table and the subroutines are called indirectly.

A processing system according to a fifth embodiment of the present invention will now be described.

Figure 10:
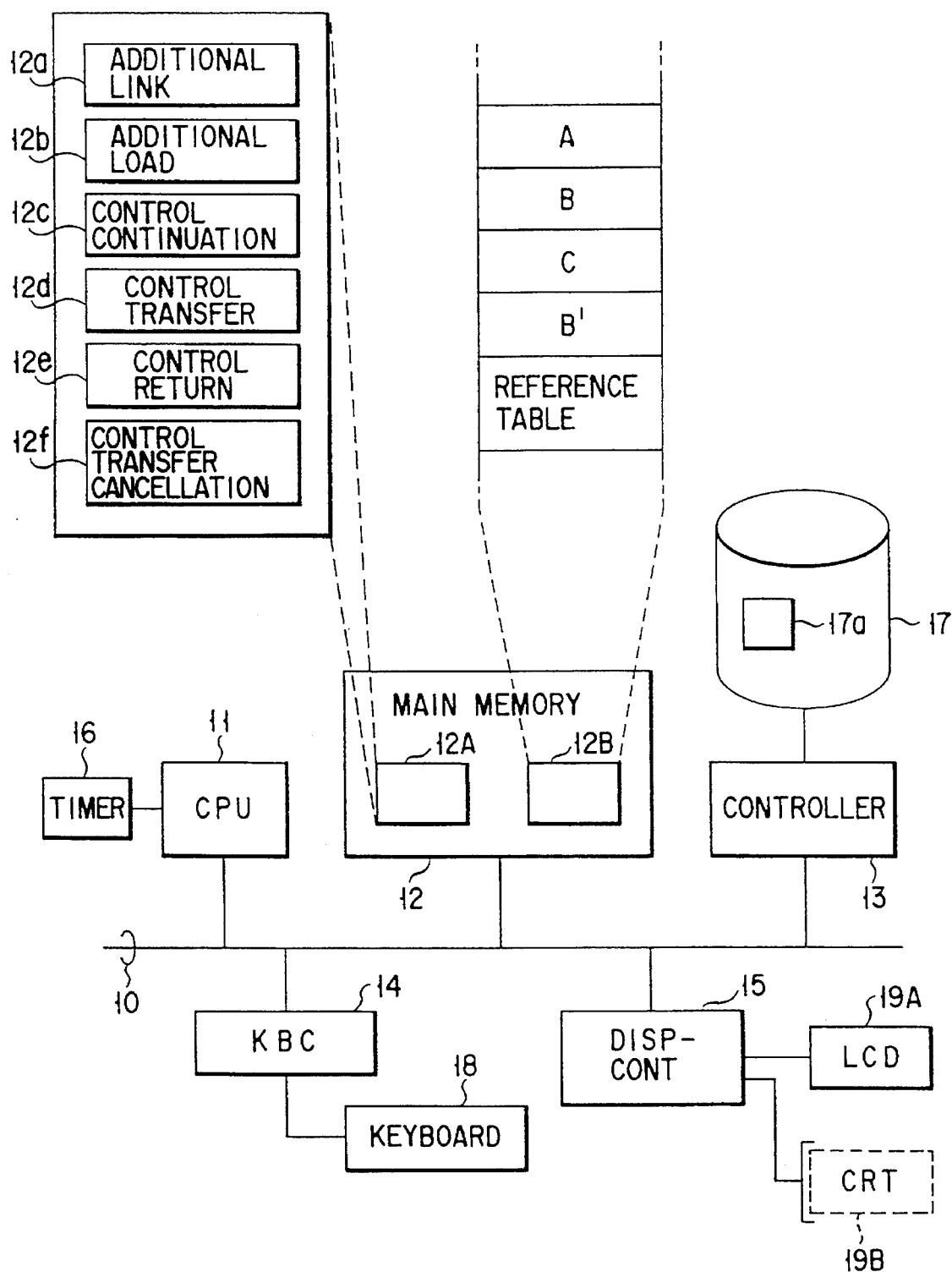
FIG. 10 is a block diagram showing a constitution of a processing system according to a fifth embodiment of the present invention.

FIG. 10 shows a constitution of the processing system according to the fifth embodiment of the present invention. In FIG. 10, the same elements as those in FIG. 1 are denoted by the same reference numerals and their descriptions are omitted.

In the processing system shown in FIG. 10, a main memory 12 stores various programs including an OS, and various execution programs stored in a disk 17 are copied when necessary. As in the first embodiment, a memory region 12A of the main memory 12 stores an additional link process 12a, an additional load process 12b, a control continuation process 12c, a control transfer process 12d, and a control return process 12e. In addition to these processes, the memory region 12 A stores a control transfer cancellation process 12f.

When the control transfer cancellation process 12f is called, the control transferred from an old-version subroutine to a new-version subroutine is returned to the old-version subroutine again.

Figure 11:
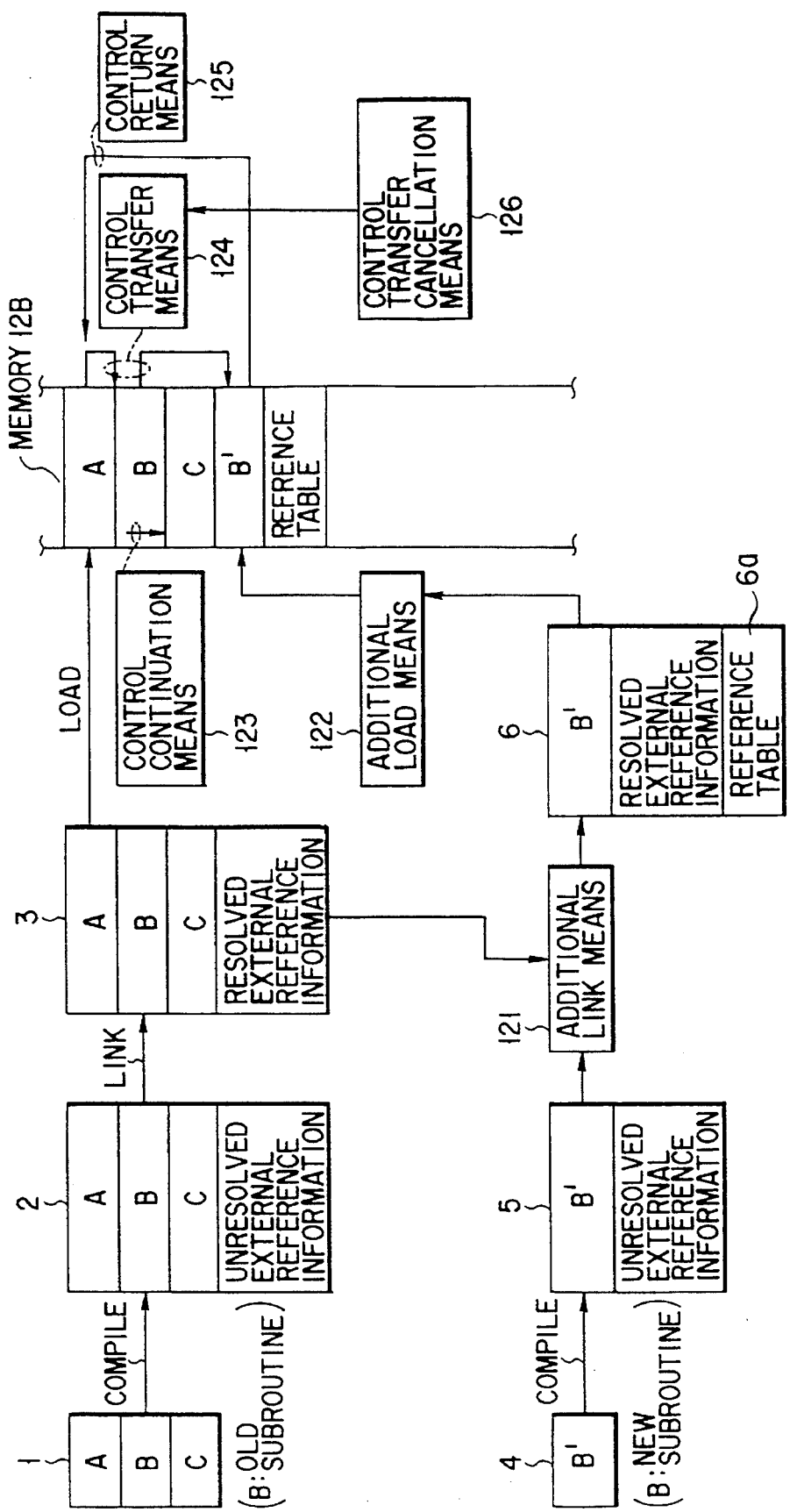
FIG. 11 is a block diagram showing a function of the processing system according to the fifth embodiment of the present invention.

FIG. 11 is a block diagram showing a function of the processing system according to the fifth embodiment of the present invention. In FIG. 11, the same elements as those in FIG. 2 are denoted by the same reference numerals and their descriptions are omitted.

A control transfer cancellation means 126 detects an entry point of the old-version subroutine when a debug of a subroutine created on the basis of debugging information is inadequate (step G1). At the detected entry point, a trap (fraudulent) instruction with which a machine instruction is replaced by the additional load means, is returned to the machine instruction (step G2).

Therefore, when the old-version subroutine is called, no traps occur, the transfer of the control to the new-version subroutine is canceled, and the control is returned to the old-version subroutine again.

A processing system according to a sixth embodiment of the present invention will now be described.

Figure 13:
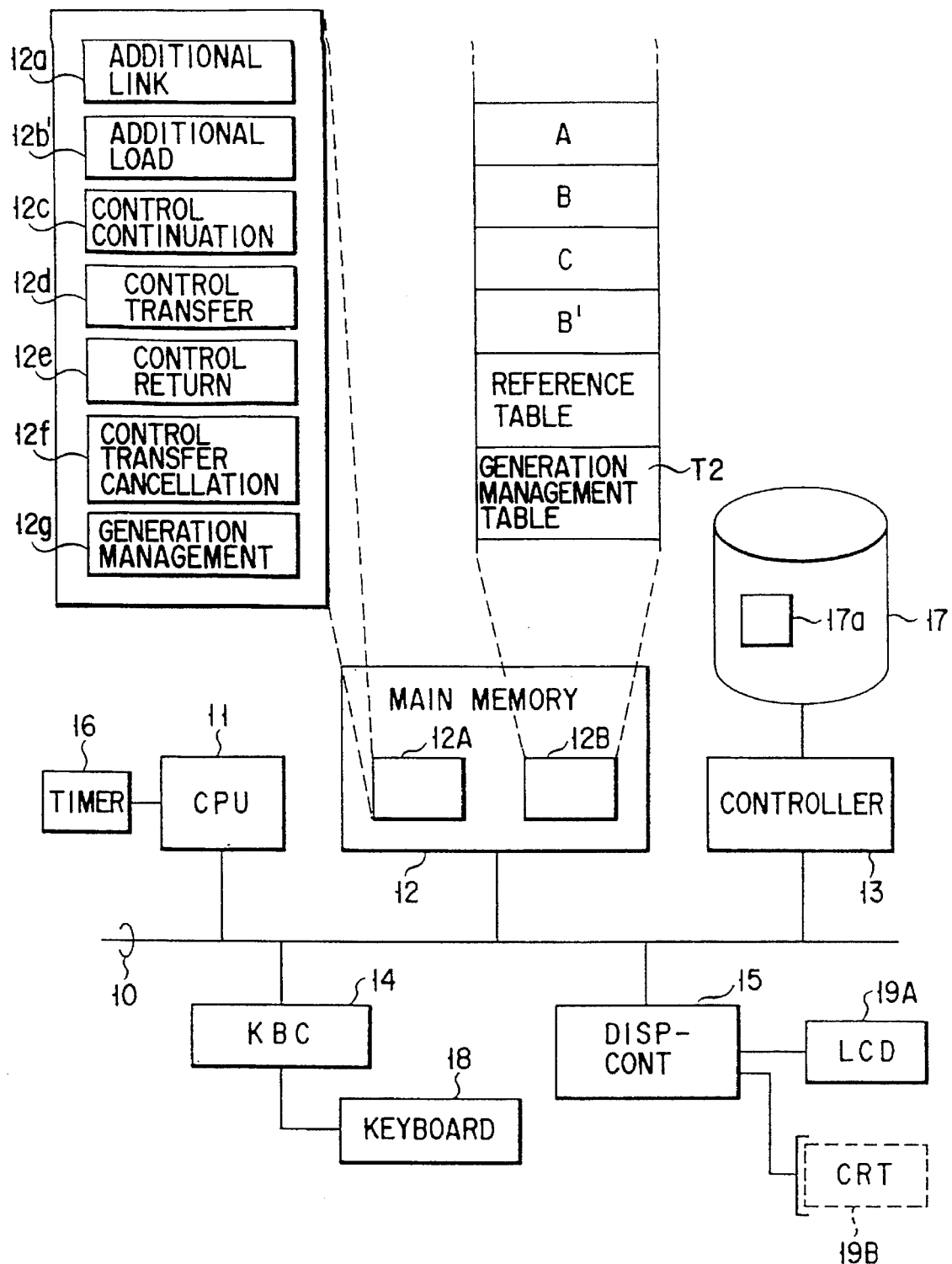
FIG. 13 is a block diagram showing a constitution of a processing system according to a sixth embodiment of the present invention.

FIG. 13 shows a constitution of this processing system. In FIG. 13, the same elements as those in FIGS. 1 and 10 are denoted by the same reference numerals and their descriptions are omitted.

In the system shown in FIG. 13, a main memory 12 stores various programs including an OS, and various execution programs stored in a disk 17 are copied when necessary. A memory region 12A of the main memory 12 stores an additional link process 12a, an additional load process 12b' which is a modification to the additional load process 12b according to the first embodiment, a control continuation process 12c, a control transfer process 12d, a control return process 12e, and a control transfer cancellation process 12f. In addition to these processes, the memory region 12 A stores a generation management process 12g.

When the generation management process 12g is called, if the debugged subroutine is debugged further or a new-version subroutine has been debugged inadequately for several generations, the control can be stopped moving to the new-version subroutine and returned to the old-version subroutine for several generations.

As shown in FIG. 13, a memory region 12B of the main memory 12 includes a generation management table T2, which will be described later.

FIG. 14 is a block diagram showing a function of the processing system according to the sixth embodiment of the present invention. In FIG. 14, the same elements as those in FIGS. 2 and 11 are indicated by the same reference numerals and their descriptions are omitted.

Figure 4:
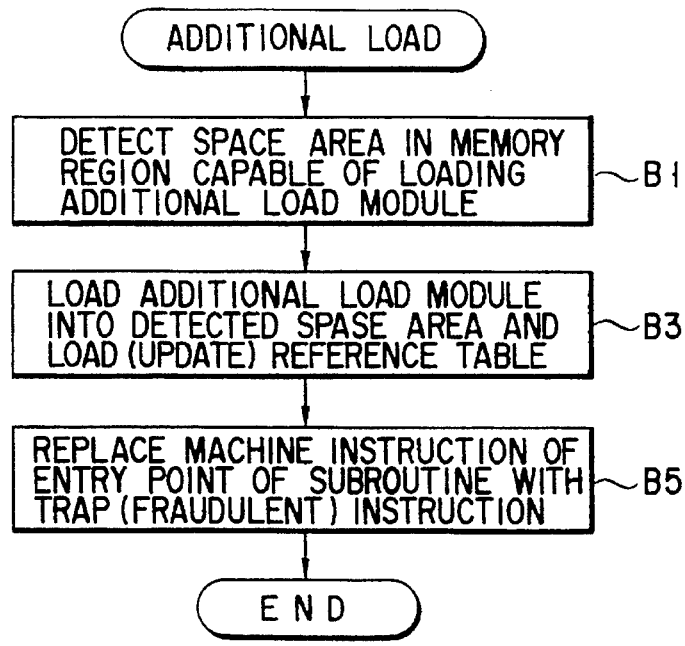
FIG. 4 is a flowchart for explaining an additional load operation of the processing system according to the first embodiment of the present invention.
Figures 12, 15:
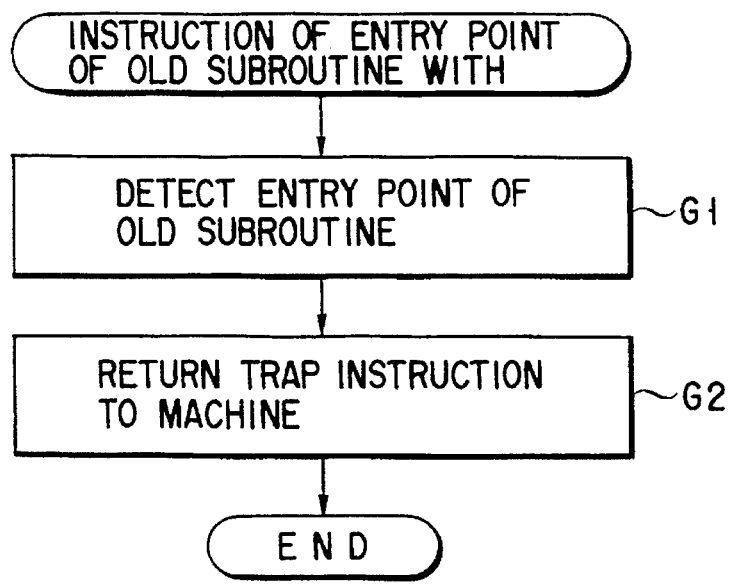
FIG. 12 is a flowchart for explaining a control transfer canceling operation of the processing system according to the fifth embodiment of the present invention.
FIG. 15 is an example of a generation management table stored in a reference table of the processing system according to the sixth embodiment of the present invention.

In FIG. 14, the additional load means 122d executes a processing for creating/registering the generation management table T2 in addition to the processings shown in FIG. 4. An example of the generation management table T2 is shown in FIG. 15. According to this table, when a generation is 0, an entry point (address) of subroutine s including a bug is "add0s" and that of old-version subroutine t is "add0t." If a bug is found in each of subroutines s and t of generation 0, and new-version subroutines s and t to which debugging information is applied are loaded, these new-version subroutines s and t are registered as subroutines of generation 1 having entry points "add1s" and "add1t", respectively. Furthermore, if neither of the subroutines s and t of generation 1 is debugged, and new-version subroutines s and t to which new debugging information is applied are loaded further, these new-version subroutines s and t are registered as subroutines of generation 2 having entry points "add2s" and "add2t", respectively.

By doing so, an entry point is registered in the generation management table T2 as a new generation whenever a new-version subroutine is loaded.

Figure 16:
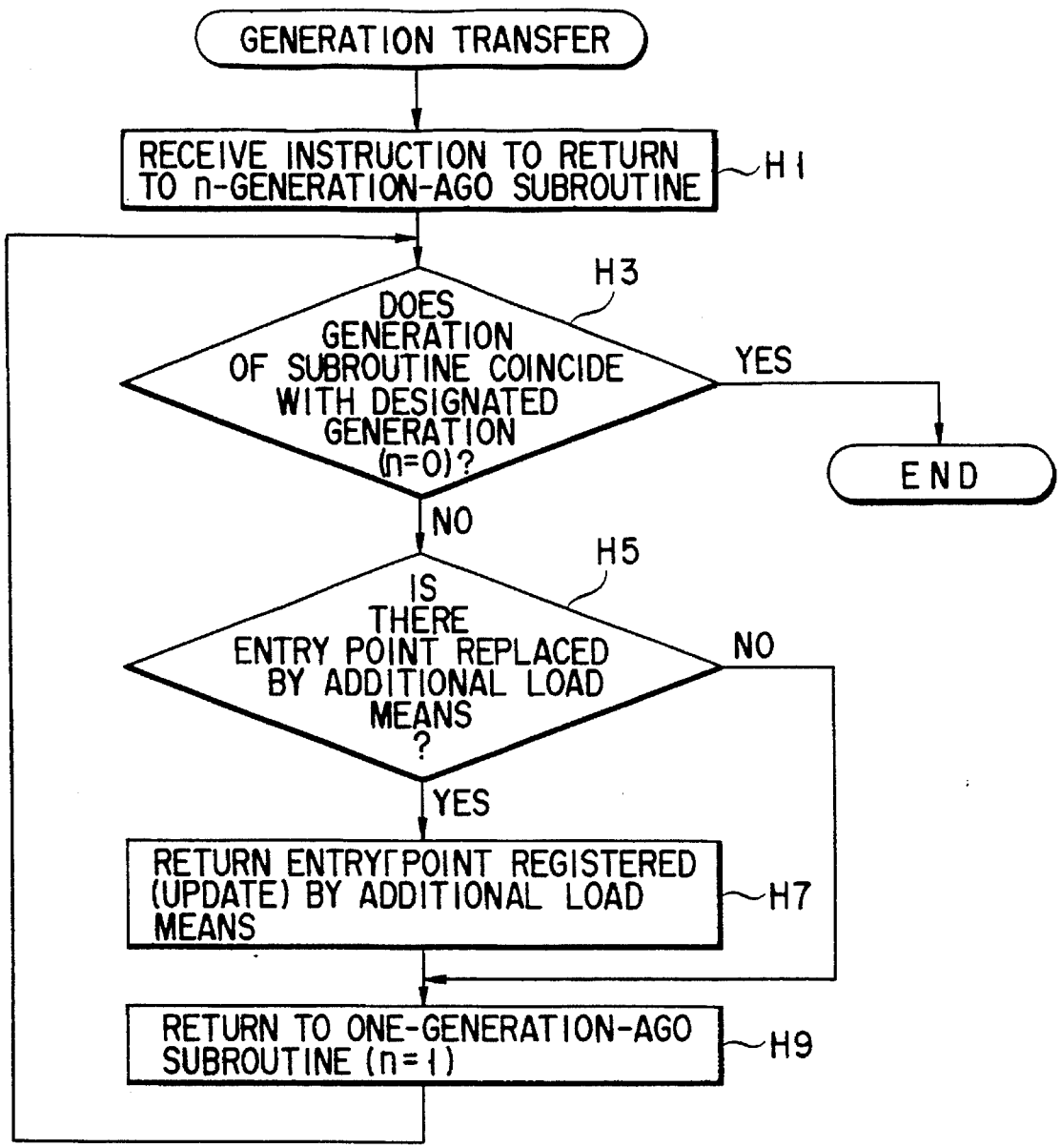
FIG. 16 is a flowchart for explaining a generation transfer operation of the processing system according to the sixth embodiment of the present invention.

An example of a generation transfer operation performed by the generation management means 127 will now be described, with reference to the flowchart shown in FIG. 16.

The generation management means 127 receives an instruction to return the control from a subroutine x to an n-generation-ago subroutine (step H1), wherein x represents a name or identification data of the subroutine, and n represents an integer. The generation management means 127 then determines whether the generation of the subroutine coincides with a designated generation, that is, whether n is 0 (step H3). If YES (n=0), the control is returned to the designated generation.

If NO, the current generation of the designated subroutine is confirmed, referring to the reference table 6a and table T2. Further, it is determined from the table T2 whether there is an entry point replaced in the additional load, in other words, whether there is a subroutine which is before the designated subroutine by one generation (step H5). If YES, an entry point registered (updated) by the additional load of the reference table 6a is rewritten as the entry point of the generation detected in step H5 (step H7).

After step H7 or if NO is determined in step H5, "1" is subtracted from n (step H9). The flow then returns to step H3, in which it is determined whether the control has been changed to the designated generation. Repeating the steps H5 to H9, the reference table 6a is updated such that the control is transferred to the designated generation (step H3, YES), and the processing is completed.

When the reference table 6a is updated, the control transferred to a new-version subroutine is transferred to a subroutine which is before the new-version subroutine by several generations, in accordance with occurrence of a trap. Therefore, if the new-version subroutine has been debugged inadequately for several generations, the generation management means stops the control from being transferred to the new-version subroutine and returns the control to the subroutine which is before the new-version subroutine by several generations.

A processing system according to a seventh embodiment of the present invention will now be described.

Figure 17:
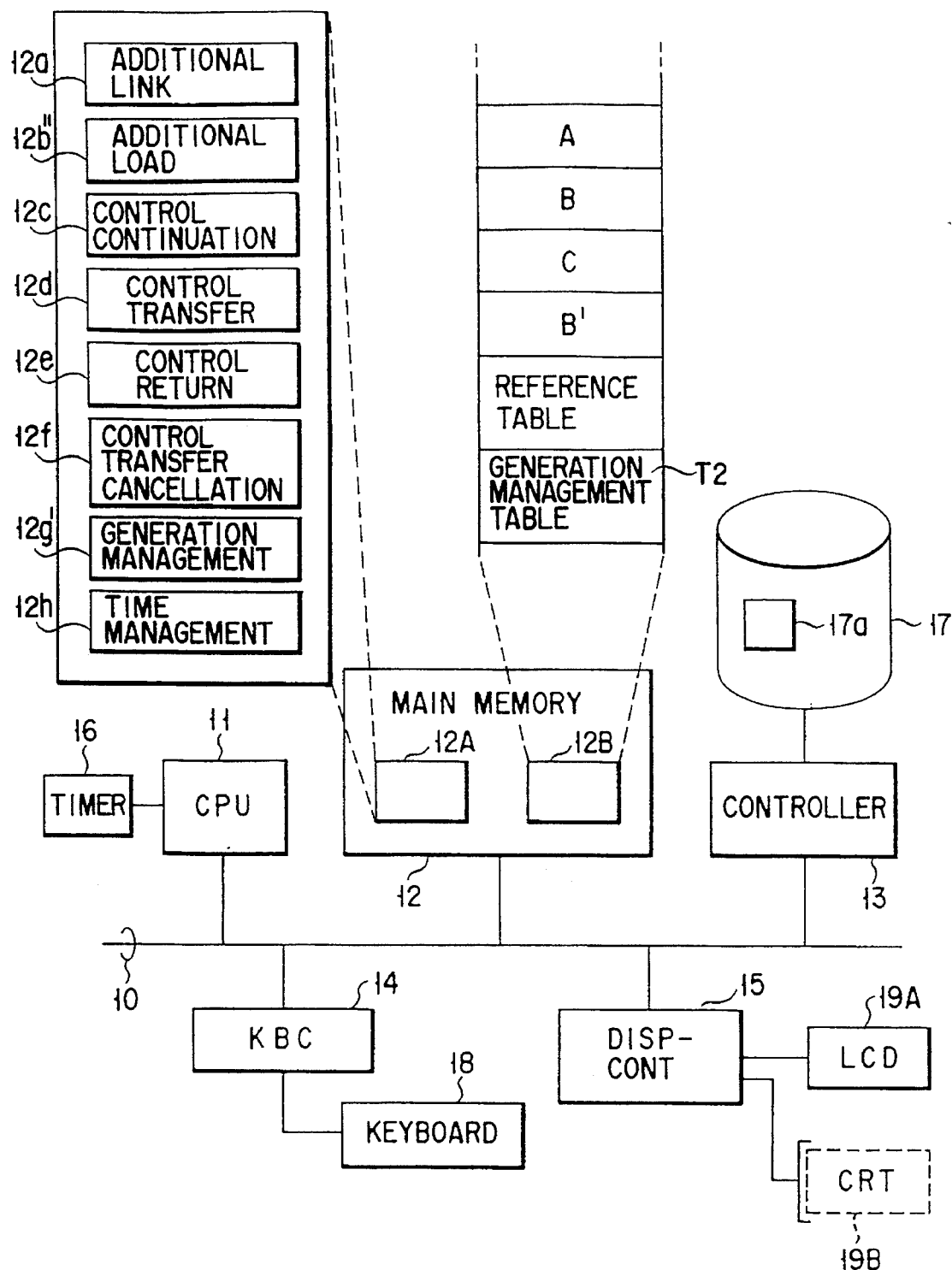
FIG. 17 is a block diagram showing a constitution of a processing system according to a seventh embodiment of the present invention.

FIG. 17 shows a constitution of this processing system. In FIG. 17, the same elements as those in FIG. 1 are denoted by the same reference numerals and their descriptions are omitted.

In the system shown in FIG. 17, a main memory 12 stores various programs including an OS, and various execution programs stored in a disk 17 are copied when necessary. A memory region 12A of the main memory 12 stores an additional link process 12a, an additional load process 12b" which is a modification to the additional load process 12b according to the first embodiment, a control continuation process 12c, a control transfer process 12d, a control return process 12e, a control transfer cancellation process 12f, and a generation management process 12g' which is a modification to the generation management process 12g according to the sixth embodiment of the present invention. In addition to these processes, the memory region 12 A stores a time management process 12h.

The time management process 12h is called, along with the additional load process 12b" and the generation management process 12g' and thus designates time when the control is transferred to the designated generation, when an additional load module is loaded.

Further, the time management process 12h is called, along with the additional load process 12b" and the generation management process 12g' and thus designates time when the control is transferred to the designated generation.

A memory region 12B of the main memory 12 includes a generation management table T2, as in the sixth embodiment described above.

Figure 18:
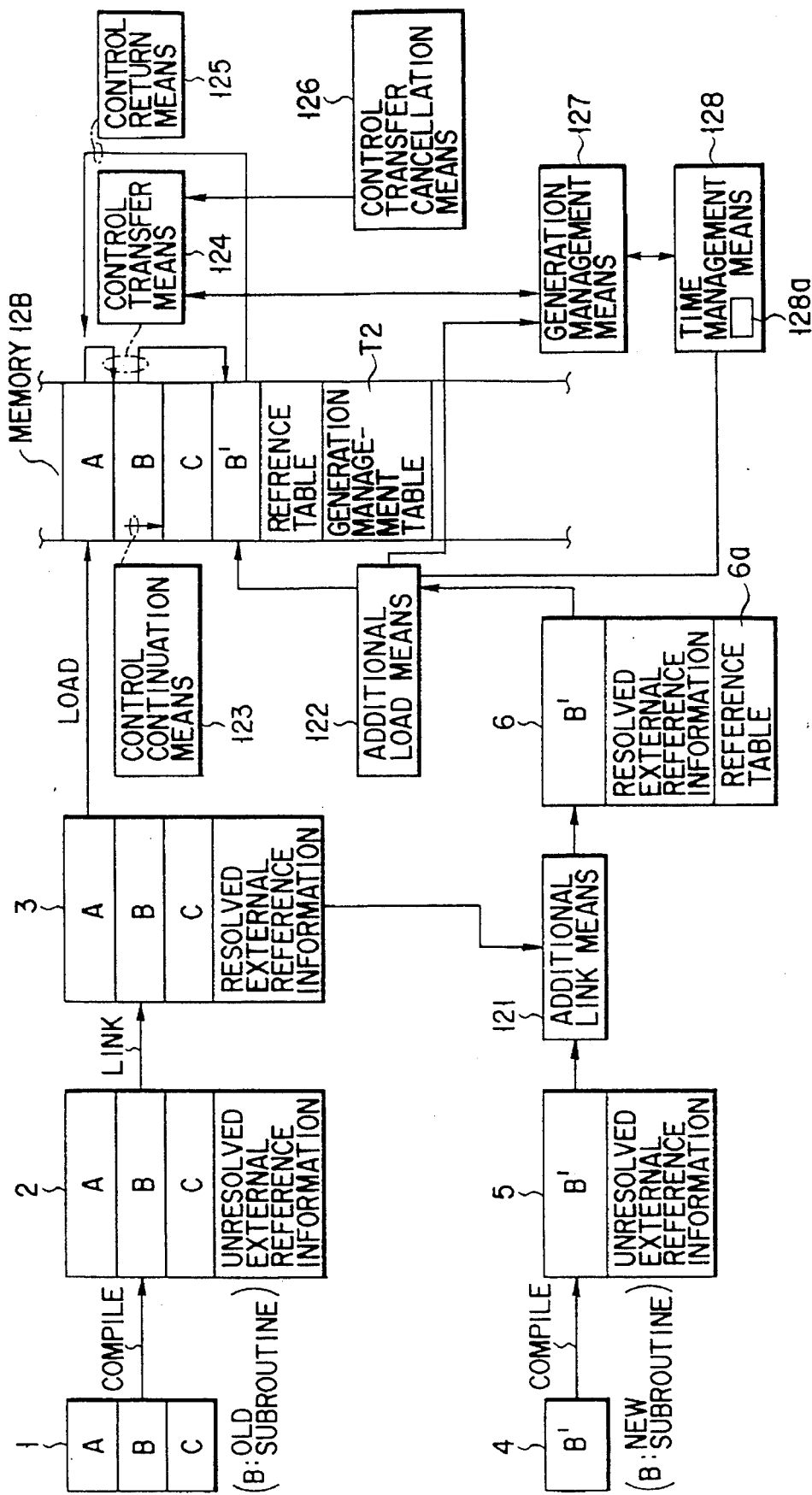
FIG. 18 is a block diagram showing a function of the processing system according to the seventh embodiment of the present invention.

FIG. 18 is a block diagram showing a function of the processing system according to the seventh embodiment of the present invention. In FIG. 18, the same elements as those in FIGS. 2 and 14 are indicated by the same reference numerals and their descriptions are omitted.

In FIG. 18, when the additional load means 122e loads an additional load module 6 in the memory region 12B, together with the generation management means 127 and time management means 128, the time when the control is transferred to the subroutine of the additional load module 6, can be designated. Furthermore, the time when the time is returned to the old-version subroutine for several generations, can be designated.

Figure 19A:
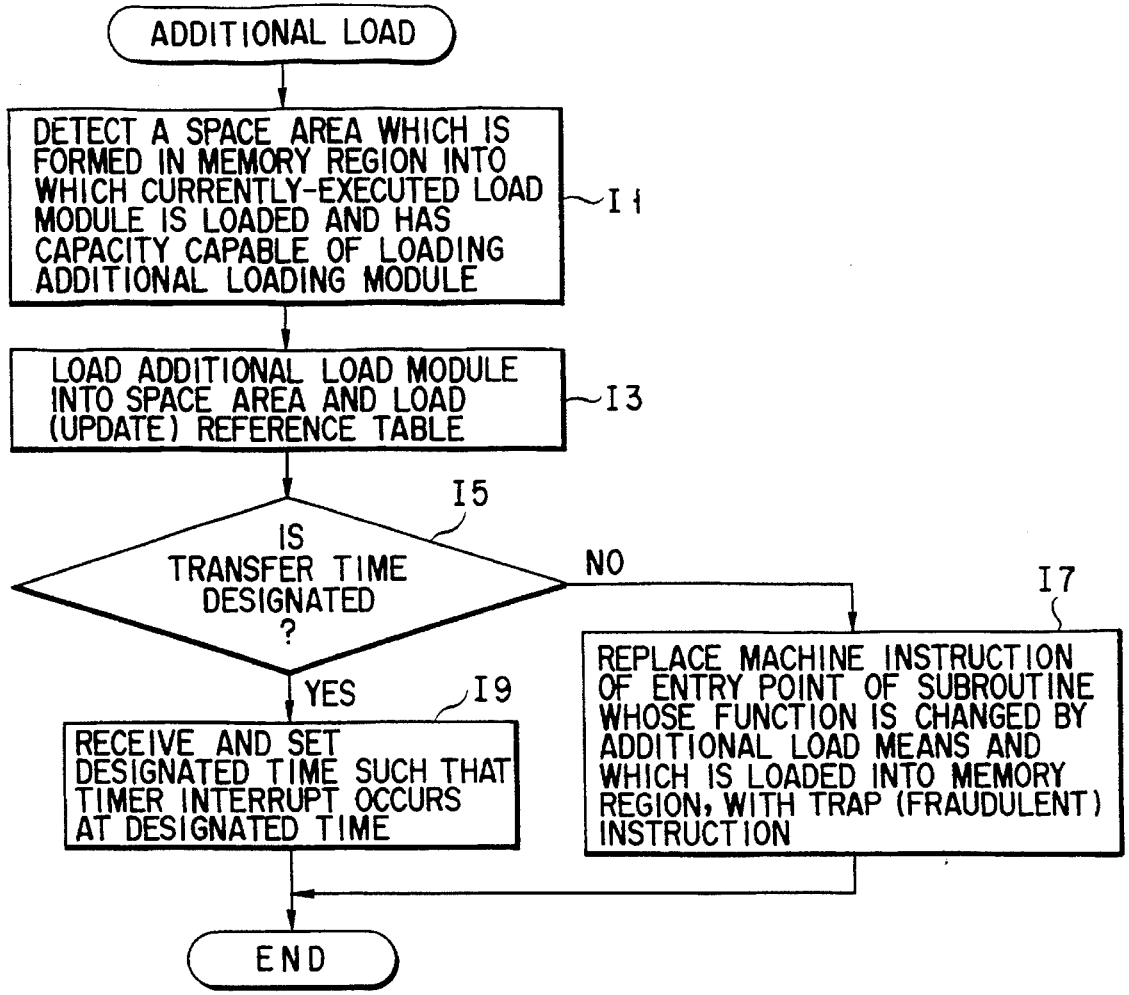
FIGS. 19A and 19B are flowcharts for explaining a first example of a time designation operation of the processing system according to the seventh embodiment of the present invention.
Figure 19B:
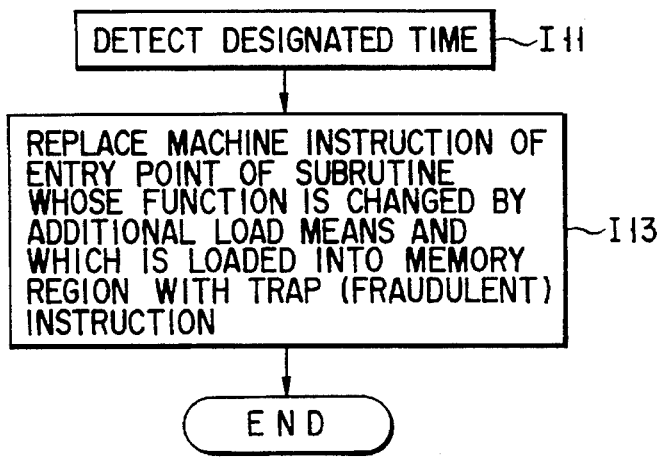

An operation for designating the time when the control is transferred to the new-version subroutine, will now be described. FIGS. 19A and 19B are flowcharts for explaining an operation of designating the time and an operation performed at the designated time in the additional load.

The additional load means 122e detects a space area which is formed in the memory region 12B into which the currently-executed load module 6 is loaded and is capable of loading the additional load module 6 (step I1). The additional load means 122e also loads the additional load module 6 into the space area detected in step I1 to load or update/register the reference table 6a (step I3).

The additional load means then calls a generation management means 127a and a time management means 128. These means 127a and 128 receive an instruction representing whether to designate the time when the control is transferred to the subroutine of the load module 6 (step I5). If the instruction is not received (NO in step I5), a machine instruction of the entry point of the subroutine whose function is changed by the additional load module is replaced with a trap (fraudulent) instruction by the additional load means 122e (step I7). After the step I7, the additional load processing wherein no transfer time is set, is completed.

If YES in step I5, the time management means receives an instruction to designate time and sets designated time 128a such that a timer interrupt occurs at the designated time (step I9). The setting of the designated time is attained by means of a timer 16 shown in FIG. 17.

When the execution of step I9 is completed, the additional load processing wherein transfer time is set, is also completed.

If, however, the time designated by the time management means 128 in the step I9 is detected after a lapse of predetermined time (step I11), the function of the additional load means replaces a machine instruction of an entry point of a subroutine whose function is changed and which has been loaded in the memory region, with a trap (fraudulent) instruction (step I13).

If the above processing is executed, time at which the control is transferred to a new-version subroutine can be designated, and the control transfer means can be applied after the designated time.

The detection of the designated time in the step I11 is attained in response to an interruption signal generated from the timer 16 shown in FIG. 17.

Figure 20B:
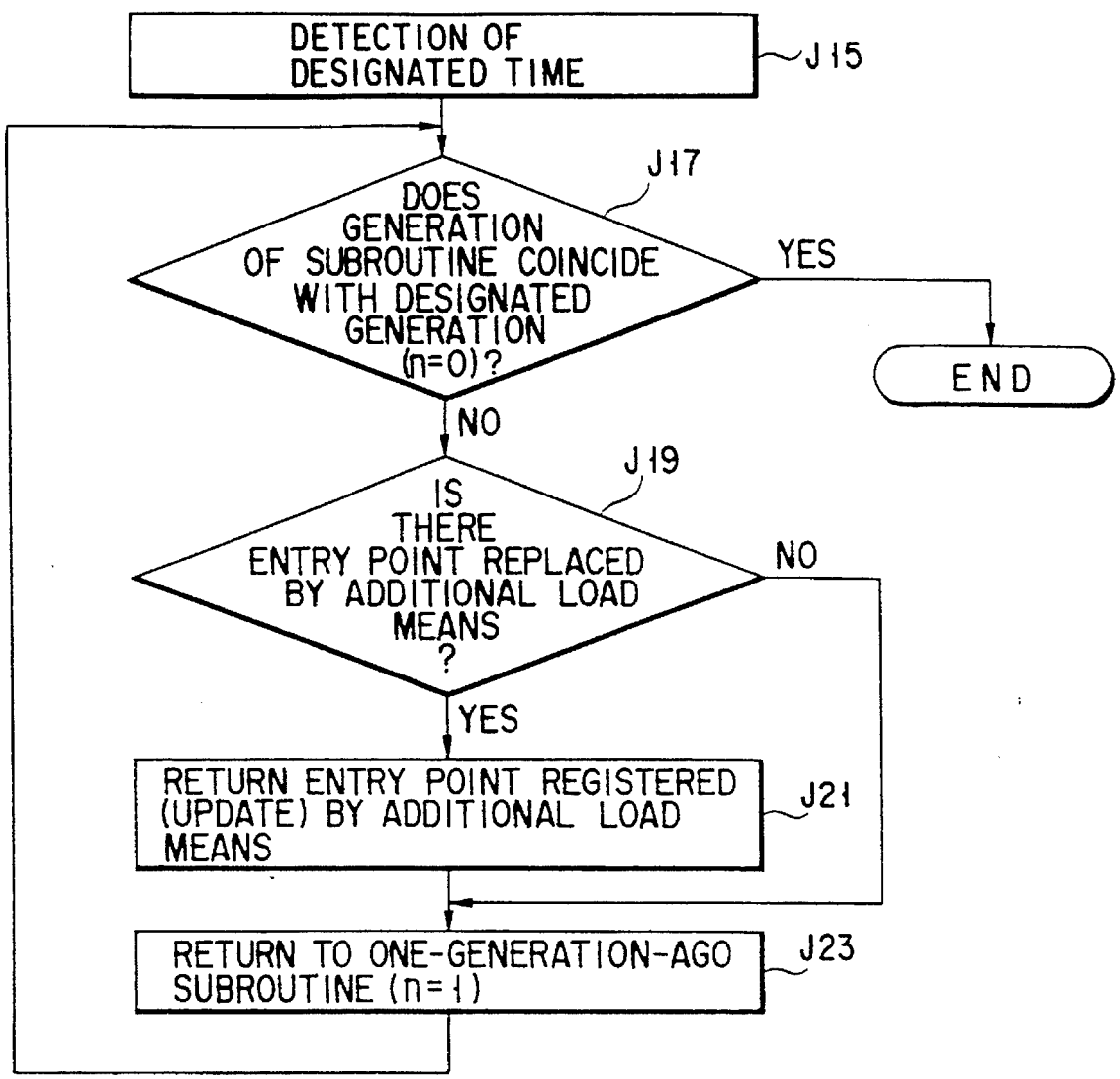

An operation for designating time at which the control is transferred to a designated generation, will now be described. FIGS. 20A and 20B are flowcharts for explaining an operation of designating the time and an operation performed at the designated time in the generation transfer.

The generation management means 127 receives an instruction to return the control from a subroutine x to an n-generation-ago subroutine (step J1), and then calls the time management means 128. The time management means 128 receives an instruction representing whether to designate time at which the control is transferred to a generation (step J3).

If the instruction is received (YES in step J3)), the time management means 128 sets designated time 128a such that a timer interrupt occurs at the designated time (step J5). The setting of the designated time is attained by means of the timer 16 shown in FIG. 17.

When the time at which the control is transferred to the generation, the execution of step J5 is completed, and the generation management means 127 and time management means 128 complete their operations, accordingly.

If an instruction not to designate the time is received (NO in step J3), the processings of steps J7, J9, J11, and J13 are executed, and the control is transferred to the subroutine of the generation designated in step J1. Since the steps J7, J9, J11, and J13 correspond to steps H3, H5, H7, and H9 shown in FIG. 16, respectively, their descriptions are omitted.

When the instruction to designate the time is input and the designated time is set by the time management means 128 (YES in step J3 and step J5), the processing executed by the time management means 128 is stopped, as described above. However, the designated time is detected by the time management means 128 after a lapse of predetermined time (step J15). The detection of the designated time is attained in response to an interrupt signal generated from the timer shown in FIG. 17.

If the designated time is detected by the time management means 128, the processings of steps J17, J19, J21, and J23 are executed, and the control is transferred to the subroutine of the generation designated in step J1. Since the steps J17, J19, J21, and J23 correspond to steps H3, H5, H7, and H9 shown in FIG. 16, respectively, their descriptions are omitted.

As described above, by use of the additional load means 122e, generation management means 127, and time management means 128, the control transfer means can be applied to an arbitrary subroutine after the designated time, in the control transfer to a new-version subroutine or the control transfer to an old-version subroutine for several generations.

According to the above embodiments, in the present invention, when debugging programs are created and compiled/linked to generate a new load module, an old load module can be replaced with the new load module without stopping the old load module. It is thus possible to achieve a system capable of changing an execution program without stopping the system and a method of dynamically changing the execution program.

Even when the new load module is inadequate and thus returned to the old load module, or even when the new load module is inadequate for several generations and thus returned to a load module which is before the new module by several generations, the control can be transferred, without stopping the module being executed or the system being operated.

Furthermore, the control can be transferred to a desired load module after the designate time by time management.

The above-described system and method for dynamically changing execution programs provide more flexible system environment and programming environment of computers.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer system having a memory device for storing source programs and various modules which are created, a memory space into which said modules are loaded, and a CPU (central processing unit), for compiling the source programs into object modules, linking the object modules to generate load modules, resolving unresolved external reference information caused in the object modules, and loading the load modules into the memory space, said computer system comprising:

additional link means for resolving unresolved external reference information caused in an object module including a second subroutine based on the external reference information resolved when the load modules are generated, and creating an additional load module from the object module including the second subroutine, thereby updating a first subroutine loaded into said memory space;

additional load means for loading the additional load module created by said additional link means into said memory space;

transfer means for calling the second subroutine of the additional load module in place of the first subroutine when the first subroutine is called from the load modules; and return means for returning control to points where the first subroutine is called when processing of the second subroutine is completed, and continuing the processing after the points.

2. The computer system according to claim 1, wherein said additional load means includes means for creating a reference table for storing entry points of the first subroutine and entry points of the second subroutine in the form of a table and means for rewriting a machine instruction of the entry point of the first subroutine as a trap instruction; and said transfer means includes determination means for determining whether a trap occurs at the entry points of the first subroutine, referring to the reference table, and means for calling the second subroutine based on the entry points stored in the reference table when said determination means determines that the trap has occurred at the entry points of the first subroutine.

3. The computer system according to claim 2, further comprising:

detection means for detecting the entry points of the first subroutine using the reference table; and transfer cancellation means for rewriting the trap instruction as the machine instruction of the entry points of the first subroutine detected by said detection means.

4. The computer system according to claim 1, wherein said additional load means includes means for rewriting the machine instruction of the entry points of the first subroutine as an unconditional branch instruction.

5. The computer system according to claim 4, further comprising means for rewriting the unconditional instruction as the machine instruction of the entry points of the first subroutine.

6. The computer system according to claim 1, wherein said additional load means includes means for detecting the points where the first subroutine is called and rewriting branch points of all of the detected points as the entry points of the second subroutine.

7. The computer system according to claim 6, further comprising means for detecting points where the second subroutine is called and rewriting branch points of all of the detected points as entry points of the first subroutine.

8. The computer system according to claim 1, wherein said computer system includes a routine table for storing subroutines called in the load modules loaded into the memory space and entry points of the subroutines in the form of a table, and said additional load means includes rewrite means for rewriting entry points of the first subroutine stored in said routine table as entry points of the second subroutine.

9. The computer system according to claim 8, further comprising means for returning the entry points of the second subroutine to the entry points of the first subroutine.

10. The computer system according to claim 1, further comprising:

generation management means for managing generations of the first subroutine and the second subroutine loaded additionally in the memory space; and generation changing means for calling a subroutine of a generation designated by said generation management means.

11. The computer system according to claim 1, further comprising:

a timer for detecting predetermined time;

setting means for setting, to said timer, time at which the load modules loaded in the memory space are changed so as to call the second subroutine in place of the first subroutine; and means for enabling said transfer means in accordance with detection of the time set to said timer by said setting means.

12. The computer system according to claim 10, further comprising:

a timer for detecting predetermined time;

setting means for setting, to said timer, transfer time at which the subroutine is transferred to the generation designated by said generation management means; and means for enabling said generation changing means in accordance with detection of the transfer time set to said timer by said setting means.

13. A computer system for compiling and linking source programs to generate load modules, and loading the load modules into a memory to be executed, comprising:

additional link means for updating some of subroutines in the source programs, compiling the subroutines into object modules of new-version subroutines, determining external reference information of the object modules based on address information of the load modules, and creating an additional load module;

additional load means for dynamically loading the additional load module in the memory space when load modules including old-version subroutines are loaded into the memory;

transfer control means for transferring control to the new-version subroutines when the load modules call the old-version subroutines; and control return means for returning the control to a calling point when processing of the new-version subroutines is completed.

14. The computer system according to claim 13, further comprising control transfer cancellation means for disabling said control transfer means and returning the control to the old-version subroutines.

15. The computer system according to claim 14, further comprising generation management means for managing generations of the new-version subroutines including the additional load module loaded into the memory and the old-version subroutines to which the control is returned by the load modules.

16. The computer system according to claim 15, further comprising time management means for adapting said control transfer means to the subroutines of an arbitrary version from designated time.

17. A method for changing execution programs in a computer system having a memory device for storing source programs and various modules which are created, a memory space into which said modules are loaded, and a CPU (central processing unit), for compiling the source programs into object modules, linking the object modules to generate load modules, resolving unresolved external reference information caused in the object modules, and loading the load modules into the memory space, said method comprising the steps of:

a) resolving unresolved external reference information caused in an object module including a second subroutine based on the external reference information resolved when the load modules are generated, and creating an additional load module from the object module including the second subroutine, thereby updating a first subroutine loaded into said memory space;

b) loading the additional load module created in said step a) into said memory space;

c) calling the second subroutine of the additional load module in place of the first subroutine when the first subroutine is called from the load modules; and d) returning control to points where the first subroutine is called when processing of the second subroutine is completed, and continuing the processing after the points.

18. The method according to claim 17, wherein said step b) includes a step of creating a reference table for storing entry points of the first subroutine and entry points of the second subroutine in the form of a table and a step of rewriting a machine instruction of the entry point of the first subroutine as a trap instruction; and said step c) includes a step of determining whether a trap occurs at the entry points of the first subroutine, referring to the reference table, and a step of calling the second subroutine based on the entry points stored in the reference table when said determining step determines that the trap has occurred at the entry points of the first subroutine.

19. The method according to claim 18, further comprising the steps of:

e) detecting the entry points of the first subroutine using the reference table; and f) rewriting the trap instruction as the machine instruction of the entry points of the first subroutine detected by said detecting step e).

20. The method according to claim 17, wherein said step b) includes a step of rewriting the machine instruction of the entry points of the first subroutine as an unconditional branch instruction.

21. The method according to claim 20, further comprising the step of:

g) rewriting the unconditional instruction as the machine instruction of the entry points of the first subroutine.

22. The method according to claim 17, wherein said step b) includes a step of detecting points where the first subroutine is called and rewriting branch points of all of the detected points as the entry points of the second subroutine.

23. The method according to claim 22, further comprising the step of:

i) detecting points where the second subroutine is called and rewriting branch points of all of the detected points as entry points of the first subroutine.

24. The method according to claim 17, wherein said computer system includes a routine table for storing subroutines called in the load modules loaded into the memory space and entry points of the subroutines in the form of a table; and said step b) includes a step of rewriting entry points of the first subroutine stored in said routine table as entry points of the second subroutine.

25. The method according to claim 24, further comprising the step of:

j) returning the entry points of the second subroutine to the entry points of the first subroutine.

26. The method according to claim 17, further comprising the steps of:

k) managing generations of the first subroutine and the second subroutine loaded additionally in the memory space; and l) calling a subroutine of a generation designated by said step k).

27. The method according to claim 17, wherein said computer system includes a timer for detecting predetermined time; and further comprising the steps of:

m) setting, to said timer, time at which the load modules loaded in the memory space are changed so as to call the second subroutine in place of the first subroutine; and n) enabling said step c) in accordance with detection of the time set to said timer by said step m).

28. The method according to claim 26, wherein said computer system includes a timer for detecting predetermined time; and further comprising the steps of:

o) setting, to said timer, transfer time at which the subroutine is transferred to the designated generation; and p) enabling said step l) in accordance with detection of the transfer time set to said timer by said step o).

29. A method of dynamically changing execution programs in a computer system for compiling and linking source programs to generate load modules, and loading the load modules into a memory to be executed, said method comprising the steps of:

a) updating some of subroutines in the source programs, compiling the subroutines into object modules of new-version subroutines, determining external reference information of the object modules based on address information of the load modules, and creating an additional load module;

b) dynamically loading the additional load module in the memory space when load modules including old-version subroutines are loaded into the memory;

c) transferring control to the new-version subroutines when the load modules call the old-version subroutines; and d) returning the control to a calling point when processing of the new-version subroutines is completed.

30. The method according to claim 29, further comprising the step of:

e) disabling said step c) and returning the control to the old-version subroutines.

31. The method according to claim 30, further comprising the step of:

f) managing generations of the new-version subroutines including the additional load module loaded into the memory and the old-version subroutines to which the control is returned by the load modules.

32. The method according to claim 31, further comprising the step of:

g) adapting said step c) to the subroutines of an arbitrary version from designated time.

* * * * *